US012652711B2

(12) United States Patent　　　　(10) Patent No.:　US 12,652,711 B2
　　Huang　　　　　　　　　　　　　(45) Date of Patent:　　Jun. 9, 2026

(54) NETWORK CONNECTION METHOD IN NETWORK SHARING, ELECTRONIC DEVICE, AND STORAGE MEDIUM

(71) Applicant: ZTE CORPORATION, Shenzhen (CN)

(72) Inventor: Chengfu Huang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 474 days.

(21) Appl. No.: 18/041,317

(22) PCT Filed: Aug. 4, 2021

(86) PCT No.: PCT/CN2021/110583
　　§ 371 (c)(1),
　　(2) Date: Feb. 10, 2023

(87) PCT Pub. No.: WO2022/033374
　　PCT Pub. Date: Feb. 17, 2022

(65) Prior Publication Data
　　US 2023/0300914 A1　　Sep. 21, 2023

(30) Foreign Application Priority Data

Aug. 11, 2020　(CN) ......................... 202010801231.8

(51) Int. Cl.
　　*H04W 76/11*　　　(2018.01)
　　*H04W 76/12*　　　(2018.01)
(52) U.S. Cl.
　　CPC ............ *H04W 76/12* (2018.02); *H04W 76/11* (2018.02)
(58) Field of Classification Search
　　CPC ... H04W 76/12; H04W 76/11; H04W 36/087; H04W 48/16; H04W 76/19; H04W 76/27
　　See application file for complete search history.

(56) References Cited

U.S. PATENT DOCUMENTS

2019/0380087 A1 * 12/2019　Park ...................... H04W 72/29
2020/0229049 A1　　7/2020　Wu et al.
　　　　　　　　　　　　(Continued)

FOREIGN PATENT DOCUMENTS

CN　　108541032 A　　9/2018
CN　　109246746 A　　1/2019
　　　　　(Continued)

OTHER PUBLICATIONS

3GPP Technical Specification Group Radio Access Network. "RAN Support for Core Network Slicing," 3GPP TSG RAN WG3 Meeting #93, R3-161759, Aug. 2016, pp. 1-13.
(Continued)

*Primary Examiner* — Lakeram Jangbahadur
(74) *Attorney, Agent, or Firm* — Vivacqua Crane, PLLC

(57)　　　　　ABSTRACT

Disclosed are a network connection method under network sharing, an electronic device and a non-transitory storage medium. The network connection method under network sharing is applied to a Distributed Unit (DU) and includes: receiving a RRC connection setup request sent by a UE; acquiring preset configuration information in response to the RRC connection setup request; encapsulating the configuration information in an RRC connection setup message, and sending the RRC connection setup message to the UE; receiving an RRC connection setup complete message sent by the UE according to the RRC connection setup message, where the RRC connection setup complete message carries a PLMN identity; and determining a target CU according to the PLMN identity, and sending an initial UL RRC message to the target CU, so that the target CU establishes a context of the UE according to the initial UL RRC message.

13 Claims, 5 Drawing Sheets

(56) References Cited

U.S. PATENT DOCUMENTS

2020/0344719 A1* 10/2020 Luo ..................... H04W 68/005
2021/0352531 A1* 11/2021 Vesely ................. H04W 76/19

FOREIGN PATENT DOCUMENTS

CN          110035498  A      7/2019
CN          110831252  A      2/2020
WO         2019138359  A1     7/2019
WO     WO-2020070720  A1 *   4/2020   ............ H04W 48/18

OTHER PUBLICATIONS

The State Intellectual Property Office of People's Republic of China. First Office Action and Search Report for CN Application No. 202010801231.8 and English translation, mailed Apr. 9, 2025, pp. 1-14.
3GPP Technical Specification Group Radio Access Network. "Further discussions on RAN sharing," 3GPP TSG-RAN WG3 #103, Feb. 25-Mar. 1, 2019, pp. 1-7.
European Patent Office. Extended European Search Report for EP Application No. 21855427.7, mailed Dec. 12, 2023, pp. 1-12.
3GPP Technical Specification Group Radio Access Network. "Architecture description (Release 15)," Jul. 31, 2019, pp. 1-46.
International Searching Authority. International Search Report and Written Opinion for PCT Application No. PCT/CN2021/110583 and English translation, mailed Nov. 3, 2021, pp. 1-11.

\* cited by examiner

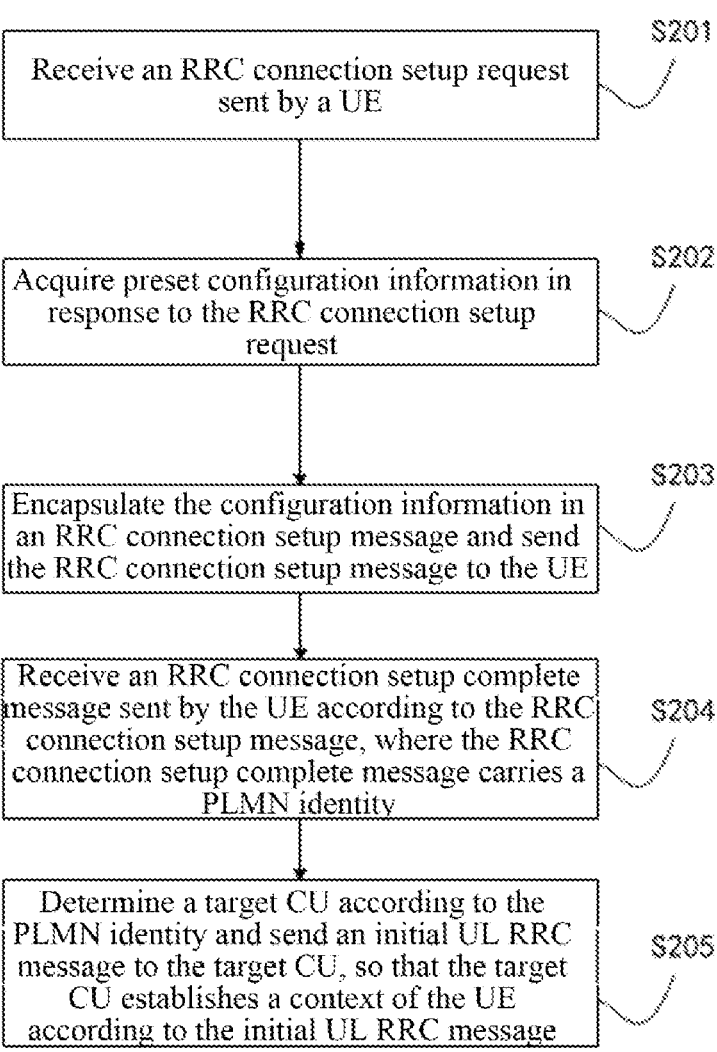

Receive an RRC connection setup request sent by a UE — S201

Acquire preset configuration information in response to the RRC connection setup request — S202

Encapsulate the configuration information in an RRC connection setup message and send the RRC connection setup message to the UE — S203

Receive an RRC connection setup complete message sent by the UE according to the RRC connection setup message, where the RRC connection setup complete message carries a PLMN identity — S204

Determine a target CU according to the PLMN identity and send an initial UL RRC message to the target CU, so that the target CU establishes a context of the UE according to the initial UL RRC message — S205

Fig. 3

NETWORK CONNECTION METHOD IN NETWORK SHARING, ELECTRONIC DEVICE, AND STORAGE MEDIUM

CROSS-REFERENCE TO RELATED APPLICATION

This application is a national stage filing under 35 U.S.C. § 371 of international application number PCT/CN2021/110583, filed Aug. 4, 2021, which claims priority to Chinese patent application No. 202010801231.8, filed Aug. 11, 2020. The contents of these applications are incorporated herein by reference in their entirety.

TECHNICAL FIELD

The present disclosure relates to the technical field of communication, in particular to a network connection method under network sharing, an electronic device and a non-transitory storage medium.

BACKGROUND

The technical standard of the 3rd Generation Partnership Project (3GPP) stipulates that the gNodeB (gNB) of the Next Generation-Radio Access Network (NG-RAN) can share the gNB by broadcasting Public Land Mobile Network (PLMN) information of multiple operators at an air interface.

In a scenario where a User equipment (UE) establishes or re-establishes a Radio Resource Control (RRC) connection, etc., a connection request message only carries an incomplete 5G Shortened Temporary Mobile Subscriber Identity (5G-S-TMSI) because of the limitation of air interface resources, and the identity does not carry PLMN information of the UE. For a shared gNB, when a connection request message of the UE is received, an PLMN serving the UE may be wrongly selected because the PLMN information is not available. Especially in a scenario where a Central Unit (CU) and a Distributed Unit (DU) are separated, the wrong PLMN selection may cause the DU to select a wrong CU, thereby leading to increased access delay and unnecessary F1 interface signaling overhead.

SUMMARY

The following is an overview of the subject described in detail herein. This overview is not intended to limit the scope of protection of the claims.

Embodiments of the present disclosure provide a network connection method under network sharing, an electronic device and a non-transitory storage medium.

In accordance with an aspect of the present disclosure, an embodiment provides a network connection method under network sharing, which is applied to a Distributed Unit (DU). The method includes: receiving a Radio Resource Control (RRC) connection setup request sent by a User Equipment (UE); acquiring preset configuration information in response to the RRC connection setup request; encapsulating the configuration information in an RRC connection setup message, and sending the RRC connection setup message to the UE; receiving an RRC connection setup complete message sent by the UE according to the RRC connection setup message, where the RRC connection setup complete message carries a Public Land Mobile Network (PLMN) identity; and determining a target Central Unit (CU) according to the PLMN identity, and sending an initial uplink (UL) RRC message to the target CU, so that the target CU establishes a context of the UE according to the Initial UL RRC message.

In accordance with another aspect of the present disclosure, an embodiment provides a network connection method under network sharing, which is applied to a DU. The method includes: receiving an RRC connection re-establishment request sent by a UE; acquiring preset configuration information in response to the RRC connection re-establishment request; encapsulating the configuration information in an RRC connection re-establishment message, and sending the RRC connection re-establishment message to the UE; receiving an RRC connection re-establishment complete message sent by the UE, where the RRC connection re-establishment complete message carries a PLMN identity; and determining a target CU according to the PLMN identity, and sending an Initial UL RRC message to the target CU, so that the target CU re-establishes a context of the UE according to the Initial UL RRC message.

In accordance with another aspect of the present disclosure, an embodiment provides a network connection method under network sharing, which is applied to a CU. The method includes: receiving an Initial UL RRC message sent by a DU; and establishing or re-establishing a context of a UE in response to the Initial UL RRC message.

In accordance with another aspect of the present disclosure, an embodiment provides an electronic device. The electronic device includes: a memory, a processor, and a computer program stored in the memory and executable by the processor which, when executed by the processor, causes the processor to implement the network connection method under network sharing described above.

In accordance with another aspect of the present disclosure, an embodiment provides a non-transitory computer-readable storage medium, storing a computer program which, when executed by a processor, causes the processor to implement the network connection method under network sharing described above.

Other features and advantages of the present disclosure will be set forth in the following description, and partly become obvious from the description, or understood by implementing the present disclosure. The objects and other advantages of the present disclosure can be realized and obtained by the structure particularly pointed out in the description, claims, and accompanying drawings.

BRIEF DESCRIPTION OF DRAWINGS

The drawings are provided for a further understanding of the technical schemes of the present disclosure, and constitute a part of the description. The drawings and the embodiments of the present disclosure are used to illustrate the technical schemes of the present disclosure, and do not constitute a limitation to the technical schemes of the present disclosure.

FIG. 3 is a flowchart of a network connection method under network sharing provided by an embodiment of the present disclosure.

DETAILED DESCRIPTION

In order to make the objects, technical schemes and advantages of the present disclosure clear, the present disclosure will be further described in detail in conjunction with the drawings and embodiments. It should be understood that the specific embodiments described here are only used to illustrate the present disclosure, and are not used to limit the present disclosure.

It should be understood that in the description of the embodiments of the present disclosure, "first", "second" and the like are only used for the purpose of distinguishing technical features, and are not intended to be understood to indicate or imply relative importance or hint the number of indicated technical features or a precedence order of indicated technical features. "At least one" refers to one or more, and "a plurality of" refers to two or more. "And/or", which describes the association relationship of associated objects, indicates that there may be three relationships, for example, A and/or B may indicate that A exists alone, A and B exist at the same time, and B exists alone, where A and B may be singular or plural. The character "/" generally indicates that there is a "or" relationship between the associated objects. "At least one of the following" and similar expressions refer to any combination of these items, including any combination of single items or plural items. For example, at least one of a, b or c may represent: a, b, c, a and b, a and c, b and c, or a and b and c, where a, b, c may be single or multiple.

In addition, the technical features involved in various embodiments of the present disclosure described below may be combined with each other if not in collision.

In order to facilitate understanding, a network sharing scenario and a network connection scheme in the network sharing scenario in the existing technology are introduced first.

Figure 1:
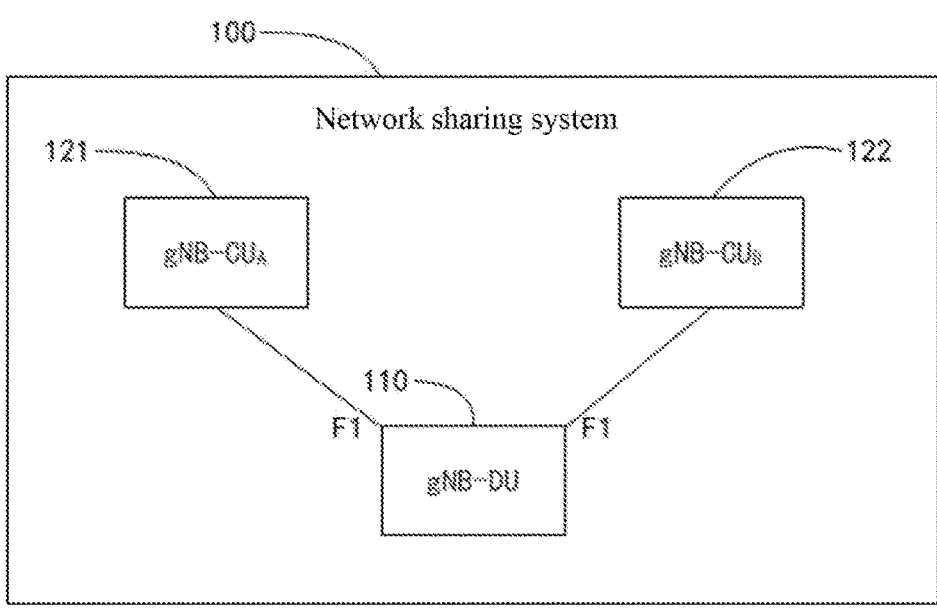
FIG. 1 is a schematic diagram of an architecture of a network sharing system.

FIG. 1 shows an architecture of a network sharing system. As shown in FIG. 1, a network sharing system 100 includes a gNB-DU 110, and at least two gNB-CUs (such as a gNB-CU$_A$ 121 and a gNB-CU$_B$ 122 in FIG. 1), each gNB-CU belonging to a different operator. The gNB-DU 110 is provided with at least two F1 interfaces each corresponding to one operator, and each gNB-CU establishes a network connection with a corresponding eNB-DU through an F1 interface of the operator to which the gNB-CU belongs.

Figure 2:
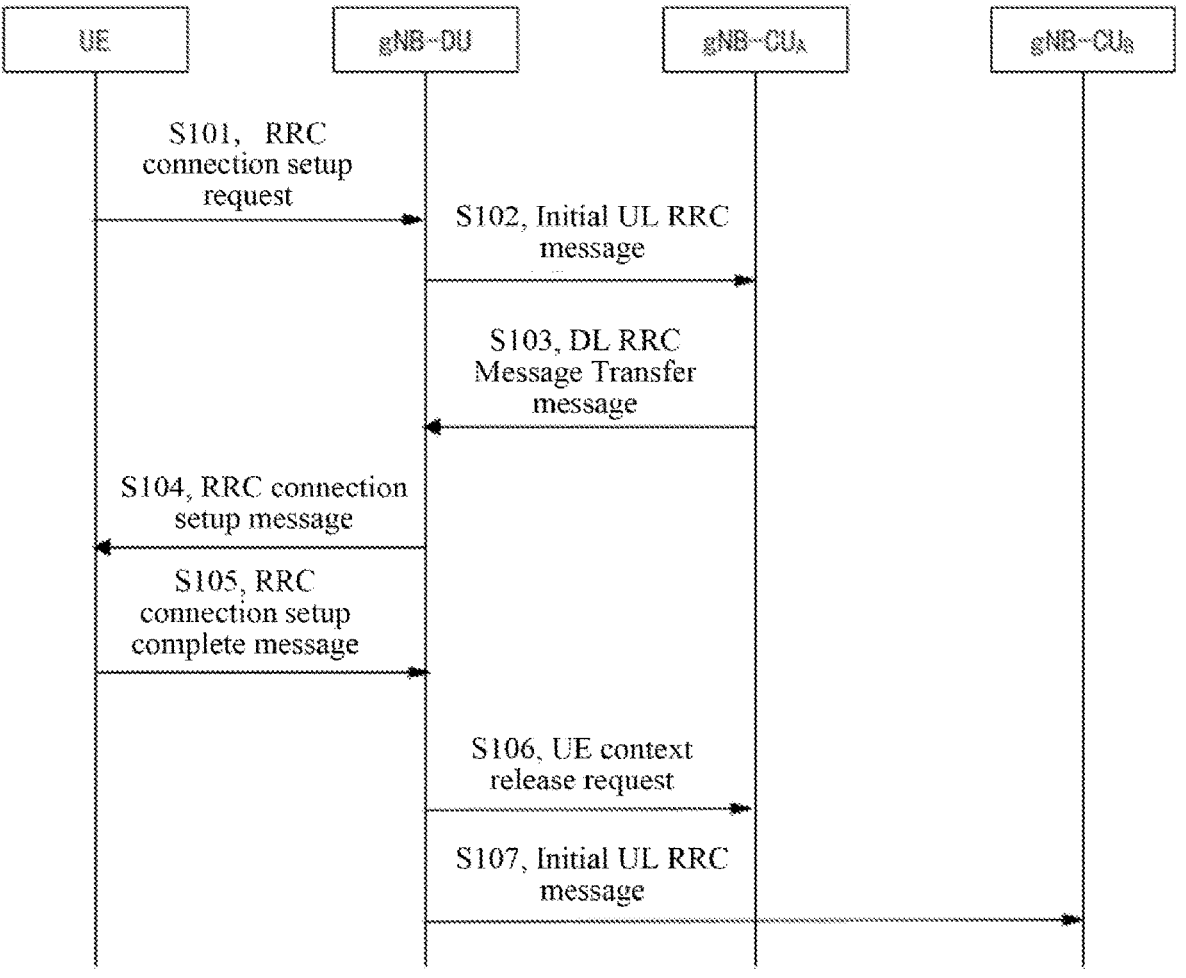
FIG. 2 is a schematic diagram of a network connection process under network sharing in a conventional technology in the art.

FIG. 2 shows a network connection process in a network sharing scenario in the existing technology, which includes following steps S101 to S107.

At S101, a UE sends a Radio Resource Control (RRC) connection setup request to the gNB-DU 110, where the RRC connection setup request usually carries a UE identity with a length of 39 bits, the identity comes from a lower 39 bits of the 5G-S-TMSI, but the 5G-S-TMSI does not contain Public Land Mobile Network (PLMN) information.

At S102, after the gNB-DU 110 receives the RRC connection setup request sent by the UE, because the RRC connection setup request does not carry the PLMN information, the gNB-DU 110 cannot determine an operator corresponding to the UE and thus cannot determine a gNB-CU corresponding to the operator, and can only randomly select a gNB-CU (gNB-CU$_A$ 121 in this step) and send an initial uplink (UL) RRC message to the randomly selected gNB-CU to request the CU to configure a wireless bearer for the UE.

At S103, the gNB-CU$_A$ 121 determines an RRC connection setup message of a terminal device, and then encapsulates a temporary identity (gNB-CU UE F1 AP ID) and an RRC connection setup message of the UE in a downlink (DL) RRC Message Transfer message and sends the DL RRC Message Transfer message to the gNB-DU 110.

At S104, the gNB-DU 110 sends an RRC connection setup message to the UE.

At S105, the UE sends an RRC connection setup complete message to the gNB-DU 110, where the RRC connection setup complete message carries an identity of a PLMN serving the UE.

At S106, the gNB-DU 110 parses the RRC connection setup complete message, determines that the PLMN serving the UE belongs to operator B according to the identity of the PLMN, and accordingly determines that the UE should access the gNB-CU$_B$ 122. Then, the gNB-DU 110 sends a UE context release request to the gNB-CU$_A$ 121 to release a UE context wrongly established on the gNB-CU$_A$ 121.

At S107, the gNB-DU 110 sends an initial UL RRC message to the gNB-CU$_B$ 122, so that the gNB-CU$_B$ 122 establishes a UE context and completes an RRC connection of the UE.

It can be seen from the example shown in FIG. 2 that once a wrong gNB-CU is selected by the gNB-DU 110, the signaling overhead of an F1 interface between the gNB-DU 110 and the gNB-CU will be increased, which will inevitably lead to an increased UE access delay and a negative impact on user experience.

Similarly, in an RRC connection re-establishment scenario of the UE under network sharing, there may also be a problem that the delay of UE connection re-establishment increases because a wrong gNB-CU is selected by the gNB-DU 110.

To solve the above problem, the embodiments of the present disclosure provide a network connection method under network sharing, an electronic device and a storage medium, to reduce UE access delay and signaling overhead and improve user experience.

FIG. 3 shows a flowchart of a network connection method under network sharing provided by an embodiment of the present disclosure. The method is applied to a DU (such as the gNB-DU 110 shown in FIG. 1) of a base station in a network sharing system. As shown in FIG. 3, the method may include following steps S201 to S205.

At S201, an RRC connection setup request sent by a UE is received.

In some examples, the UE sends an RRC connection setup request to the DU of the base station in the network sharing system to request to establish an RRC connection so as to access a network. Due to the limitation of air interface resources, the RRC connection setup request only carries an incomplete temporary mobile subscriber identity, and the identity does not carry PLMN information of the UE.

At S202, preset configuration information is acquired in response to the RRC connection setup request.

In some examples, after the DU receives the RRC connection setup request from the UE, the DU acquires preset configuration information to send the configuration information to the UE, so that the UE performs configuration according to the configuration information. In the embodiment of the present disclosure, the configuration information does not need to be acquired through the CU of the base station, thereby avoiding the problem caused by selecting a wrong CU because the RRC connection setup request does not carry the PLMN information of the UE.

During specific implementation, the configuration information in S202 is preset in the DU, that is, RB configuration information that has completed parameter setting is saved locally in the DU. After the DU receives the RRC connection setup request from the UE, the preset configuration information is acquired locally and sent to the UE for configuration.

In some examples, the configuration information in S202 may include Radio Bearer (RB) configuration information. The RB configuration information may further be Signaling Radio Bear 1 (SRB1) configuration information. During specific implementation, in order to ensure the success rate of establishing RRC connection by the UE, an optimal value may be configured for a parameter of the SRB1. For example, based on a mapping relationship between historical parameter values of the SRB1 and the number of successful UE configurations, a value priority of the parameter of the SRB1s is determined, and then the optimal value of the parameter of the SRB1 is determined. The optimal value of the parameter of the SRB1 is stored in the DU as default configuration information of the SRB1, so that DU sends the default configuration information to UE after receiving the RRC connection setup request from UE. It should be understood that the configuration information in S202 may further include other functional configuration information, which will not be specifically limited in the embodiment of the present disclosure.

At S203, the configuration information is encapsulated in an RRC connection setup message, and the RRC connection setup message is sent to the UE.

In some examples, the DU encapsulates the configuration information acquired in S202 in an RRC connection setup message, and sends the RRC connection setup message carrying the configuration information to the UE, so that the UE performs RRC connection configuration based on the configuration information in the RRC connection setup message. For example, the configuration information includes SRB1 configuration information, and the UE completes the establishment of SRB1 based on the SRB1 configuration information.

At S204, an RRC connection setup complete message sent by the UE according to the RRC connection setup message is received, where the RRC connection setup complete message carries a Public Land Mobile Network (PLMN) identity.

In some examples, the UE receives the RRC connection setup message sent by the DU, performs relevant configuration based on the configuration information in the RRC connection setup message, and then sends an RRC connection setup complete message to the DU to feed back completion of configuration at the UE side. The RRC connection setup complete message carries a PLMN identity which can be used to indicate the operator to which the UE belongs.

At S205, a target CU is determined according to the PLMN identity, and an initial UL RRC message is sent to the target CU, so that the target CU establishes a context of the UE according to the initial UL RRC message.

In some examples, after receiving the RRC connection setup complete message, the DU extracts the PLMN identity from the RRC connection setup complete message, and then determines the operator to which the UE belongs according to the PLMN identity. According to the operator to which the UE belongs, the DU determines a CU corresponding to the operator to which the UE belongs, and takes the determined CU as a target CU. The DU sends an initial UL RRC message to the target CU through an F1 interface corresponding to the operator to which the UE belongs, so that the CU can establish a context for the UE according to the initial UL RRC message, and complete the RRC connection setup of the UE.

It should be understood that in the existing technology, upon receiving the initial UL RRC message from the DU, the CU usually generates configuration information allocated for the UE, encapsulates the configuration information in a DL RRC Message Transfer message, and sends the DL RRC Message Transfer message to the DU. However, in the embodiment of the present disclosure, since the UE has completed the configuration based on the configuration information allocated by the DU and sent the RRC connection setup complete message to the DU in the previous step, the CU does not need to perform a related operation of allocating configuration information for the UE.

In the embodiment of the present disclosure, after the CU receives the initial UL RRC message from the DU, the CU executes a process of establishing a context for the UE, to enable the UE to access the network.

As an example, the process after the CU receives the initial UL RRC message from the DU may include following operations that: the CU sends an initial UE message to an Access and Mobility Management Function (AMF); the AMF sends an initial UE context setup request to the CU; the CU sends a UE context setup request to the DU; the DU sends an RRC security mode command to the UE; the DU returns a UE context setup response to the CU; the UE returns an RRC security mode complete message to the DU; the DU encapsulates the RRC message in an UL RRC Message Transfer message and sends the UL RRC Message Transfer message to the CU; the CU generates an RRC connection reconfiguration message and encapsulates the RRC connection reconfiguration message in a DL RRC Message Transfer message; the DU sends the RRC connection reconfiguration message to the UE; the UE sends an RRC connection reconfiguration complete message to the DU; the DU encapsulates the RRC message in an UL RRC Message Transfer message and sends the UL RRC Message Transfer message to the CU; and the CU sends an initial UE context setup response to the AMF. In this way, the context of the UE is established, and the entire initial access process of the UE on wireless access is also completed.

In some examples, in S205, prior to sending the initial UL RRC message to the target CU, the method may further include: encapsulating the RRC connection setup complete message in the initial UL RRC message.

In some examples, the DU encapsulates the RRC connection setup complete message received from the UE in the initial UL RRC message, so that the initial UL RRC message sent to the CU carries the RRC connection setup complete message. The CU determines that relevant configuration of the RRC connection has been completed at the UE side based on the RRC connection setup complete message in the initial UL RRC message, thus canceling the step of generating a DL RRC Message Transfer message, and directly executing the process of establishing a context for the UE.

According to the scheme of the embodiment of the present disclosure, after receiving the RRC connection setup request sent by the UE, the DU encapsulates the preset configuration information in an RRC connection setup message and sends the RRC connection setup message to the UE without requesting the configuration information from the CU, thus avoiding UE access failure caused by selecting a wrong CU by the DU, reducing the UE access delay and signaling overhead, and improving the user experience.

Figure 4:
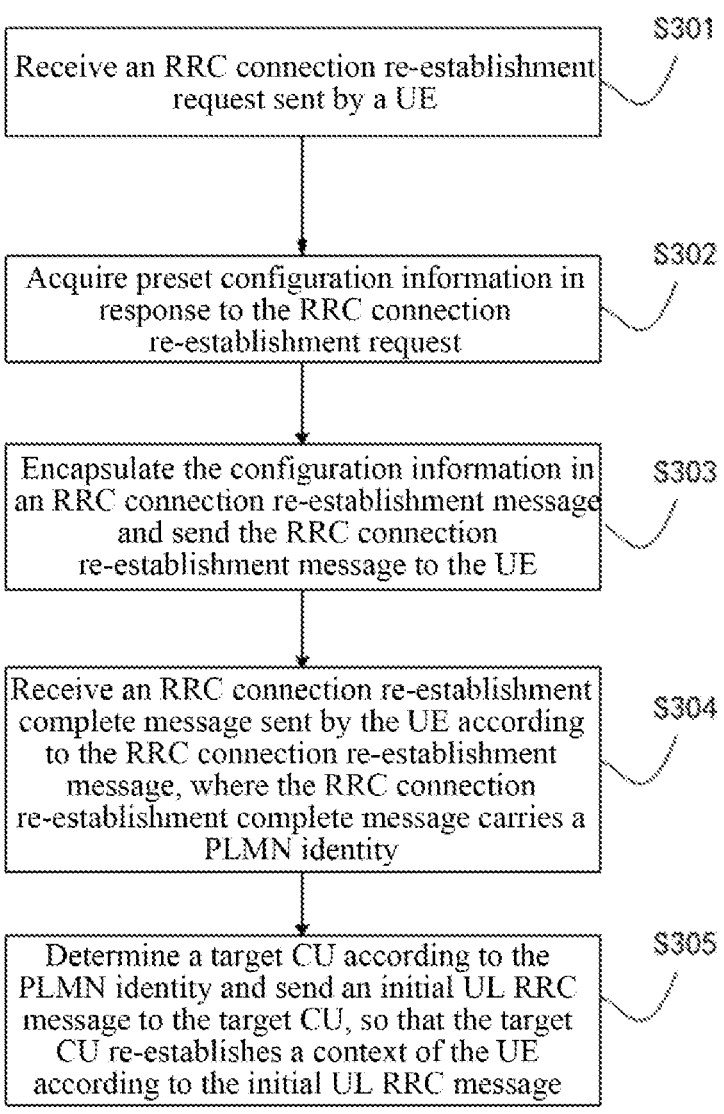
FIG. 4 is a flowchart of a network connection method under network sharing provided by another embodiment of the present disclosure.

FIG. 4 shows a flowchart of a network connection method under network sharing provided by an embodiment of the present disclosure. The method is applied to a DU (such as the gNB-DU 110 shown in FIG. 1) of a base station in a network sharing system. As shown in FIG. 3, the method may include following steps S301 to S305.

At S301, an RRC connection re-establishment request sent by a User Equipment (UE) is received.

In some examples, the UE sends an RRC connection re-establishment request to the DU of the base station in the network sharing system, to request re-establishment of the RRC connection to achieve re-access to the network. Due to the limitation of air interface resources, the RRC connection re-establishment request only carries an incomplete temporary mobile subscriber identity, which does not carry Public Land Mobile Network (PLMN) information of the UE.

At S302, preset configuration information is acquired in response to the RRC connection re-establishment request.

In some examples, after the DU receives the RRC connection re-establishment request from the UE, the DU acquires preset configuration information and sends the configuration information to the UE, so that the UE performs configuration according to the configuration information. In the embodiment of the present disclosure, the configuration information does not need to be acquired through the CU of the base station, thereby avoiding the problem caused by selecting a wrong CU because the RRC connection re-establishment request does not carry the PLMN information of the UE.

During specific implementation, the configuration information in S302 is preset in the DU, that is, RB configuration information that has completed parameter setting is saved locally in the DU. After the DU receives the RRC connection re-establishment request from the UE, the preset configuration information is acquired locally and sent to the UE for configuration.

In some examples, the configuration information in S302 may include RB configuration information. The RB configuration information may further be SRB1 configuration information. During specific implementation, in order to ensure the success rate of re-establishing RRC connection by the UE, an optimal value may be configured for a parameter of the SRB1. For example, based on a mapping relationship between historical parameter values of the SRB1 and the number of successful UE configurations, a value priority of the parameter of the SRB1s is determined, and then the optimal value of the parameter of the SRB1 is determined. The optimal value of the parameter of the SRB1 is stored in the DU as default configuration information of the SRB1, so that DU sends the default configuration information to UE after receiving the RRC connection re-establishment request from UE. It should be understood that the configuration information in S302 may further include other functional configuration information, which will not be specifically limited in the embodiment of the present disclosure.

At S303, the configuration information is encapsulated in an RRC connection re-establishment message, and the RRC connection re-establishment message is sent to the UE.

In some examples, the DU encapsulates the configuration information acquired in S302 in an RRC connection re-establishment message, and sends the RRC connection re-establishment message carrying the configuration information to the UE, so that the UE performs configuration on the RRC re-establishment connection based on the configuration information in the RRC connection re-establishment message. For example, the configuration information includes SRB1 information, and the UE re-establishes SRB1 based on the configuration information.

At S304, an RRC connection re-establishment complete message sent by the UE according to the RRC connection re-establishment message is received, where the RRC connection re-establishment complete message carries a PLMN identity.

In some examples, the UE receives the RRC connection re-establishment message sent by the DU, performs relevant configuration based on the configuration information in the RRC connection re-establishment message, and then sends an RRC connection re-establishment complete message to the DU to feed back completion of configuration at UE side. The RRC connection re-establishment complete message carries a PLMN identity which can be used to indicate the operator to which the UE belongs.

At S305, a target CU is determined according to the PLMN identity, and an initial UL RRC message is sent to the target CU, so that the target CU re-establishes a context of the UE according to the initial UL RRC message.

In some examples, after receiving the RRC connection re-establishment complete message, the DU extracts the PLMN identity from the RRC connection re-establishment complete message, and then determines the operator to which the UE belongs according to the PLMN identity. According to the operator to which the UE belongs, the DU determines a CU corresponding to the operator to which the UE belongs, and takes the determined CU as a target CU. The DU sends an initial UL RRC message to the target CU through an F1 interface corresponding to the operator to which the UE belongs, so that the CU can re-establish a context for the UE according to the initial UL RRC message, and complete the RRC connection re-establishment of the UE.

It should be understood that in the existing technology, upon receiving the initial UL RRC message from the DU, the CU usually generates configuration information allocated for the UE, encapsulates the configuration information in a DL RRC Message Transfer message, and sends the DL RRC Message Transfer message to the DU. However, in the embodiment of the present disclosure, since the UE has completed the configuration based on the configuration information allocated by the DU and sent the RRC connection re-establishment complete message to the DU in the previous step, the target CU does not need to perform a related operation of allocating configuration information for the UE.

In the embodiment of the present disclosure, after the target CU receives the initial UL RRC message from the DU, the target CU executes a process of re-establishing the context for the UE to enable the UE to re-accesses the network.

As an example, the process after the target CU receives the initial UL RRC message from the DU may include: sending a context acquisition request for context of the UE to a source base station; receiving a context acquisition response message sent by the source base station according to the context acquisition request, where the context acquisition response message carries context information of the UE; and re-establishing the context of the UE according to the context information of the UE.

In some examples, an Xn link (for example, X2 link) is established between the source base station and the target CU, and the target CU exchanges signaling with the source base station through the Xn link. The target CU determines the source base station according to the information in the initial UL RRC message, and sends the context acquisition request for context of the UE to the source base station, where the context acquisition request includes an identity of the UE, the source base station searches the context information of the UE based on the identity of the UE, encapsulates the context information of the UE in the context acquisition response message and returns the context acquisition response message to the target CU. After acquiring the context information of the UE from the source base station, the target CU completes the RRC connection re-establishment with the UE based on the context information.

In some embodiments, prior to sending the context acquisition request for context of the UE to the source base station, the method may further include: locally searching, by the target CU, the context information of the UE according to the information in the initial UL RRC message. If the context information of the UE is not saved locally, the source base station is determined according to the information in the initial UL RRC message, and the context acquisition request for context of the UE is sent to the source base station.

In some examples, in S305, prior to sending the initial UL RRC message to the target CU, the method may further include: encapsulating the RRC connection re-establishment complete message in the initial UL RRC message.

In some examples, the DU encapsulates the RRC connection setup complete message received from the UE in the initial UL RRC message, so that the initial UL RRC message sent to the CU carries the RRC connection setup complete message. The CU determines that the relevant configuration of the RRC connection has been completed at the UE side based on the RRC connection setup complete message in the initial UL RRC message, thus canceling the step of generating a DL RRC Message Transfer message, and directly executing the process of establishing a context for the UE.

According to the scheme of the embodiment of the present disclosure, after receiving the RRC connection re-establishment request sent by the UE, the DU encapsulates the preset configuration information in the RRC connection re-establishment message and sends the RRC connection re-establishment message to the UE without requesting the configuration information from the CU, thus avoiding UE access failure caused by selecting a wrong CU by the DU, reducing the UE access delay and signaling overhead, and improving the user experience.

Figure 5:
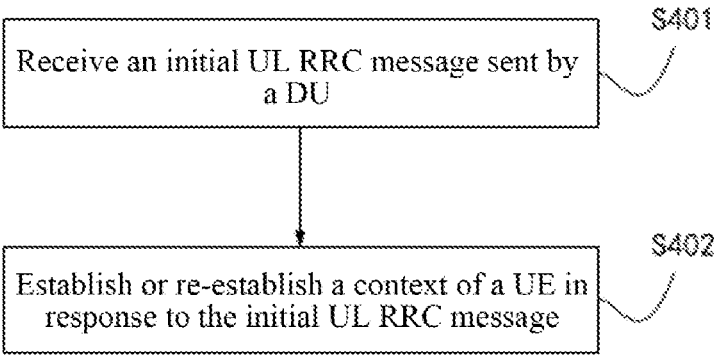
FIG. 5 is a flowchart of a network connection method under network sharing provided by another embodiment of the present disclosure.

FIG. 5 shows a flowchart of a network connection method under network sharing provided by an embodiment of the present disclosure. The method is applied to a CU (such as the gNB-CU$_A$ 121 or gNB-CU$_B$ 122 shown in FIG. 1) of a base station in a network sharing system. As shown in FIG. 4, the method may include following steps S401 to S402.

At S401, an initial UL RRC message sent by a DU is received.

At S402, a context of a UE is established or re-established in response to the initial UL RRC message.

It should be understood that in the existing technology, upon receiving the initial UL RRC message from the DU, the CU usually generates configuration information allocated for the UE, encapsulates the configuration information in a DL RRC Message Transfer message, and sends the DL RRC Message Transfer message to the DU. However, in the embodiment of the present disclosure, since the UE has completed the configuration based on the configuration information allocated by the DU and sent the RRC connection setup/re-establishment complete message to the DU in the previous step, the target CU does not need to perform a related operation of allocating configuration information for the UE.

In the embodiment of the present disclosure, after the target CU receives the initial UL RRC message from the DU, the target CU executes a process of establishing/re-establishing a context for the UE, to enable the UE to initially access/re-access the network.

During specific implementation, the RRC connection setup complete message or RRC connection re-establishment complete message returned by the UE to the DU may be encapsulated in the initial UL RRC message. The DU sends the initial UL RRC message carrying the RRC connection setup complete message or RRC connection re-establishment complete message to the CU. After receiving the initial UL RRC message from the DU, the CU parses the initial UL RRC message.

When it is determined that the initial UL RRC message carries the RRC connection setup complete message, the context of the UE is established in response to the initial UL RRC message.

As an example, the process of establishing a context for the UE by the CU may include following operations that: the CU sends an initial UE message to an Access and Mobility Management Function (AMF); the AMF sends an initial UE context setup request to the CU; the CU sends a UE context setup request to the DU; the DU sends an RRC security mode command to the UE; the DU returns a UE context setup response to the CU; the UE returns an RRC security mode complete message to the DU; the DU encapsulates the RRC message in an UL RRC Message Transfer message and sends the UL RRC Message Transfer message to the CU; the CU generates an RRC connection reconfiguration message and encapsulates the RRC connection reconfiguration message in a DL RRC Message Transfer message; the DU sends the RRC connection reconfiguration message to the UE; the UE sends an RRC connection reconfiguration complete message to the DU; the DU encapsulates the RRC message in an UL RRC Message Transfer message and sends the UL RRC Message Transfer message to the CU; and the CU sends an initial UE context setup response to the AMF. In this way, the UE context is established, and the entire initial access process of the UE on wireless access is also completed.

When it is determined that the initial UL RRC message carries the RRC connection re-establishment complete message, the context of the UE is re-established in response to the initial UL RRC message.

As an example, the process of re-establishing a context of the UE by the CU may include: sending a context acquisition request for context of the UE to a source base station; receiving a context acquisition response message sent by the source base station according to the context acquisition request, where the context acquisition response message carries context information of the UE; and re-establishing the context of the UE according to the context information of the UE.

In some examples, an Xn link (for example, X2 link) is established between the source base station and the target CU, and the target CU exchanges signaling with the source base station through the Xn link. The target CU determines the source base station according to the information in the initial UL RRC message, and sends the context acquisition request for context of the UE to the source base station, where the context acquisition request includes an identity of the UE, the source base station searches the context information of the UE based on the identity of the UE, encapsulates the context information of the UE in the context acquisition response message and returns the context acquisition response message to the target CU. After acquiring the context information of the UE from the source base station, the target CU completes the RRC connection re-establishment with the UE based on the context information.

In some embodiments, prior to sending the context acquisition request for context of the UE to the source base station, the method may further include: locally searching, by the target CU, the context information of the UE according to the information in the initial UL RRC message. If the context information of the UE is not saved locally, the source base station is determined according to the information in the initial UL RRC message, and the context acquisition request for context of the UE is sent to the source base station.

In the embodiment of the present disclosure, the CU directly executes the UE context setup/re-establishment process without sending the configuration information of the UE to the DU, which reduces the signaling overhead, reduces the delay when the UE initially accesses/re-accesses the network, and improves the user experience.

To facilitate the understanding of the method in the embodiment of the present disclosure, the network connection method under network sharing provided by the embodiment of the present disclosure will be further introduced with a specific application scenario in conjunction with the network sharing system 100 shown in FIG. 1.

Scenario I

Figure 6:
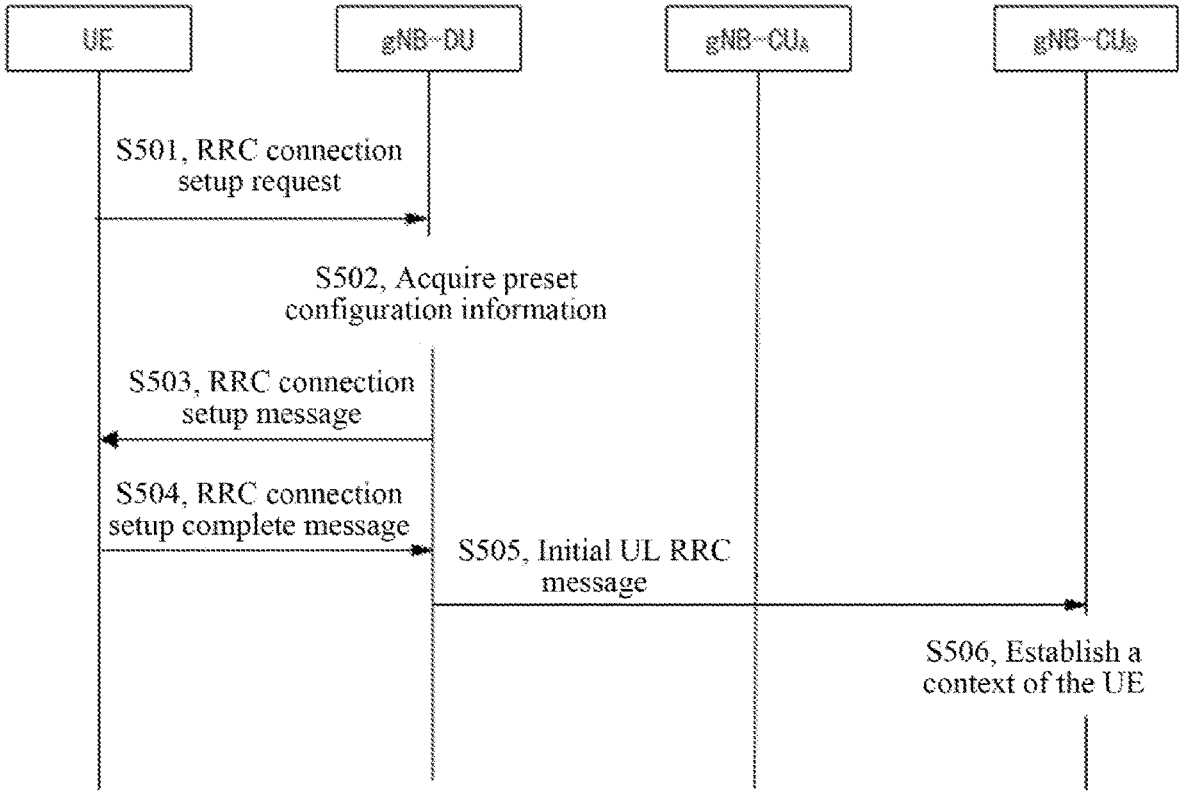
FIG. 6 is a flowchart of a network connection method under network sharing provided by an embodiment of the present disclosure.

Referring to FIG. 6, the UE initially requests to access the network, which may be realized by following steps S501 to S506.

At S501, the UE sends an RRC connection setup request to the gNB-DU 110.

At S502, the gNB-DU 110 acquires preset configuration information in response to the RRC connection setup request. In this example, the configuration information is preset in the gNB-DU 110.

At S503, the gNB-DU 110 encapsulates the configuration information in an RRC connection setup message, and sends the RRC connection setup message to the UE.

At S504, the UE performs configuration according to the configuration information carried in the RRC connection setup message sent by the gNB-DU 110, and returns an RRC connection setup complete message, where the RRC connection setup complete message carries a PLMN identity.

At S505, the gNB-DU 110 determines a target CU according to the PLMN identity carried in the RRC connection setup complete message, and sends an initial UL RRC message to the target CU. In this example, if the PLMN identity indicates that the UE belongs to operator B, it can be determined that the target CU is the gNB-CU$_B$ 122 belonging to operator B, and the gNB-DU 110 sends the initial UL RRC message to the gNB-CU$_B$ 122.

At S506, the gNB-CU$_B$ 122 establishes a context of the UE in response to the initial UL RRC message sent by the gNB-DU 110.

Scenario II

Figure 7:
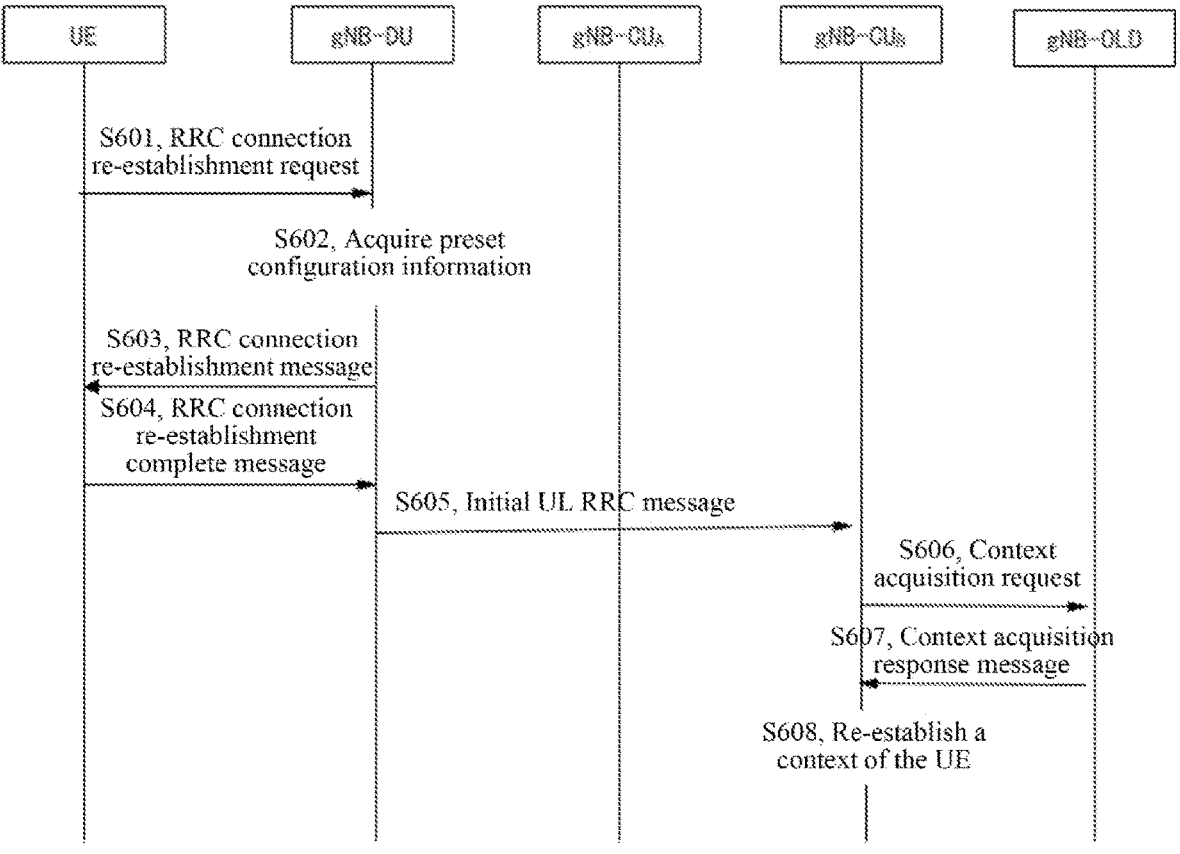
FIG. 7 is a flowchart of a network connection method under network sharing provided by an embodiment of the present disclosure.

Referring to FIG. 7, the UE requests to re-access the network, which may be realized by following steps S601 to S608.

At S601, the UE sends an RRC connection re-establishment request to the gNB-DU 110.

At S602, the gNB-DU 110 acquires preset configuration information in response to the RRC connection re-establishment request. In this example, the configuration information is preset in the gNB-DU 110.

At S603, the gNB-DU 110 encapsulates the configuration information in an RRC connection re-establishment message, and sends the RRC connection re-establishment message to the UE.

At S604, the UE performs configuration according to the configuration information carried in the RRC connection re-establishment message sent by the gNB-DU 110, and returns an RRC connection re-establishment complete message, where the RRC connection re-establishment complete message carries a PLMN identity.

At S605, the gNB-DU 110 determines a target CU according to the PLMN identity carried in the RRC connection re-establishment complete message, and sends an initial UL RRC message to the target CU. In this example, if the PLMN identity indicates that the UE belongs to operator B, it can be determined that the target CU is the gNB-CU$_B$ 122 belonging to operator B, and the gNB-DU 110 sends the initial UL RRC message to the gNB-CU$_B$ 122.

At S606, the gNB-CU$_B$ 122 sends a context acquisition request for context of the UE to a source base station (gNB-OLD) in response to the initial UL RRC message sent by the gNB-DU 110.

At S607, the gNB-OLD returns a context acquisition response message to the gNB-CU$_B$ 122, where the context acquisition response message carries context information of the UE.

At S608, the gNB-CU$_B$ 122 re-establishes a context of the UE according to the context information of the UE carried in the context acquisition response message.

It should be understood that the UE involved in the embodiments of the present disclosure includes a handheld device with a wireless communication function, a vehicle-mounted device, a wearable device or a computing device. In some examples, the UE may be a mobile phone, a tablet computer or a computer with a wireless transceiving function. The UE may also be a Virtual Reality (VR) terminal device, an Augmented Reality (AR) terminal device, a wireless terminal device in industrial control, a wireless terminal device in unmanned driving, a wireless terminal device in telemedicine, a wireless terminal device in smart grid, a wireless terminal device in smart city, a wireless terminal device in smart home, or the like.

It can be further understood that in the above-mentioned embodiments, the descriptions of all embodiments have their own focus, and for the parts not detailed or recorded in a certain embodiment, please refer to the related descriptions of other embodiments.

Figure 8:
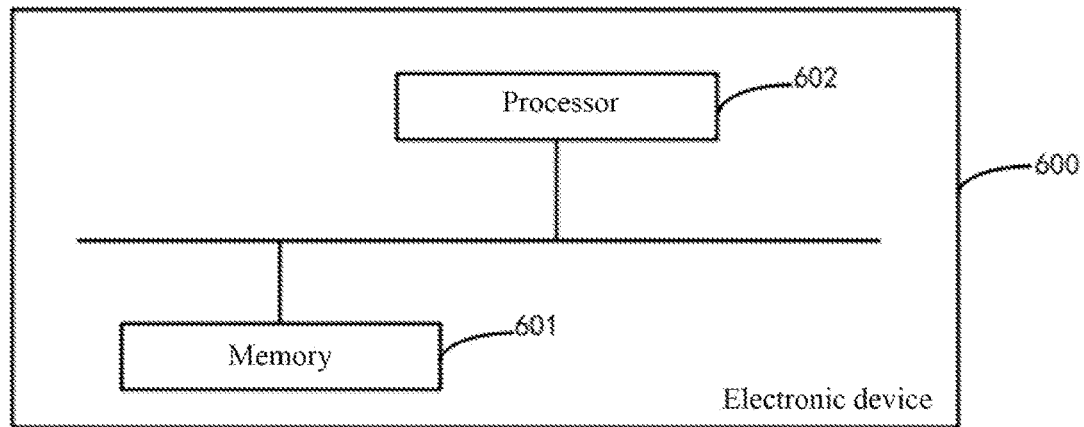
FIG. 8 is a schematic structural diagram of an electronic device provided by an embodiment of the present disclosure.

FIG. 8 shows an electronic device 600 provided by an embodiment of the present disclosure. As shown in FIG. 8, the electronic device 600 includes, but not limited to, a memory 601 and a processor 602.

The memory 601 is configured to store a program.

The processor 602 is configured to execute the program stored in the memory 601, where the program stored in the memory 601, when executed by the processor 602, causes the processor 602 to implement the above-mentioned network connection method under network sharing.

The processor 602 and the memory 601 may be connected by a bus or in other manners.

As a non-transient computer-readable storage medium, the memory 601 may be configured to store non-transient software programs and non-transient computer-executable programs, such as the network connection method under network sharing described in any one of the embodiments of the present disclosure. The processor 602 executes non-transient software programs and instructions stored in the memory 601, to implement the above-mentioned network connection method under network sharing.

The memory 601 may include a program storage area and a data storage area. The program storage area may store an operating system, and an application program required by at least one function. The data storage area may store data configured to perform the above-mentioned network connection method under network sharing. In addition, the memory 601 may include a high-speed random access memory, and may further include a non-transient memory, such as at least one magnetic disk storage device, a flash memory device, or other non-transient solid state storage device. In some implementations, the memory 601 may include memories remotely located with respect to the processor 602, and these remote memories may be connected to the processor 602 through networks. Examples of the above networks include, but are not limited to, the Internet, an intranet, a local area network, a mobile communication network and combinations thereof.

The non-transient software programs and instructions required to implement the above-mentioned network connection method under network sharing are stored in the memory 601 which, when executed by one or more processors 602, cause the one or more processors 602 to implement the network connection method under network sharing provided by any one of the embodiments of the present disclosure.

An embodiment of the present disclosure further provides a non-transitory storage medium, storing a computer-executable instruction which, when executed by a processor, causes the processor to implement the above-mentioned network connection method under network sharing.

In an embodiment, the storage medium stores a computer-executable instruction which, when executed by one or more control processors 602, for example, by one processor 602 in the electronic device 600, causes the one or more processors 602 to perform the network connection method under network sharing provided by any one of the embodiments of the present disclosure.

An embodiment of the present disclosure includes: receiving an RRC connection setup request sent by a UE; acquiring preset configuration information in response to the RRC connection setup request; encapsulating the configuration information in an RRC connection setup message, and sending the RRC connection setup message to the UE; receiving an RRC connection setup complete message sent by the UE according to the RRC connection setup message, where the RRC connection setup complete message carries a PLMN identity; determining a target CU according to the PLMN identity, and sending an initial UL RRC message to the target CU, so that the target CU establishes a context of the UE according to the initial UL RRC message. According to the scheme of the embodiment of the present disclosure, after receiving the RRC connection setup request sent by the UE, the DU encapsulates the preset configuration information in an RRC connection setup message and sends the RRC connection setup message to the UE without requesting the configuration information from the CU, thus avoiding UE access failure caused by selecting a wrong CU by the DU, reducing the UE access delay and signaling overhead, and improving the user experience.

The embodiments described above are merely illustrative, and the units described as separate components may or may not be physically separated, that is, the units may be located in one place, or may be distributed onto multiple network elements. Some or all of the modules may be selected according to actual needs to achieve the purpose of the scheme of the embodiments.

As will be understood by those having ordinary skills in the art that all or some of the steps, and systems in the method disclosed above may be implemented as software, firmware, hardware and appropriate combinations thereof. Some or all of the physical components may be implemented as software executed by a processor, such as a central processing unit, a digital signal processor or a microprocessor, or as hardware, or as an integrated circuit, such as an application specific integrated circuit. Such software may be distributed on a computer-readable medium, and the computer-readable medium may include a computer storage medium (or a non-transitory medium) and a communication medium (or a transitory medium). As is well known to those having ordinary skills in the art, the term "computer storage medium" includes volatile and nonvolatile, removable and non-removable media implemented in any method or technology for storing information such as computer readable instructions, data structures, program modules or other data. A computer storage medium may include RAM, ROM, EEPROM, flash memory or other memory technologies, CD-ROM, digital versatile disk (DVD) or other optical disk storage, magnetic cassette, magnetic tape, magnetic disk storage or other magnetic storage devices, or any other media that can be used to store desired information and can be accessed by a computer. In addition, it is well known to those having ordinary skills in the art that the communication medium may generally include computer readable instructions, data structures, program modules or other data in a modulated data signal such as a carrier wave or other transmission mechanism, and may include any information delivery medium.

The above is a detailed description of some embodiments of the present disclosure, but the present disclosure is not limited to the above embodiments. Those having ordinary skills in the art can also make various equivalent modifications or substitutions without violating the scope of the present disclosure, and these equivalent modifications or substitutions are included in the scope defined by the claims of the present disclosure.

What is claimed is:

1. A network connection method under network sharing, performed by a Distributed Unit (DU), and comprising:

receiving a Radio Resource Control (RRC) connection setup request sent by a User Equipment (UE);

acquiring preset configuration information locally in response to the RRC connection setup request, wherein the configuration information is preset and saved in the DU, the configuration information comprises Signaling Radio Bear 1 (SRB1) configuration information, the SRB1 configuration information comprises an optimal value of a parameter of the SRB1, and the optimal value of the parameter of the SRB1 is determined based on a mapping relationship between historical parameter values of the SRB1 and the number of successful UE configurations;

encapsulating the configuration information in an RRC connection setup message, and sending the RRC connection setup message to the UE;

receiving an RRC connection setup complete message sent by the UE according to the RRC connection setup message, wherein the RRC connection setup complete message carries a Public Land Mobile Network (PLMN) identity; and determining a target Central Unit (CU) according to the PLMN identity, and sending an initial uplink (UL) RRC message to the target CU.

2. The method of claim 1, further comprising:

encapsulating the RRC connection setup complete message in the initial UL RRC message.

3. An electronic device, comprising: a memory, a processor, a Distributed Unit (DU), a Central Unit (CU) and a computer program stored in the memory and executable by the processor which, when executed by the processor, causes the processor to perform the method of claim 1.

4. A non-transitory computer-readable storage medium, storing a computer program which, when executed by a processor, causes the processor to perform the method of claim 1.

5. A network connection method under network sharing, which is performed by a Distributed Unit (DU), the method comprising:

receiving a Radio Resource Control (RRC) connection re-establishment request sent by a User Equipment (UE);

acquiring preset configuration information locally in response to the RRC connection re-establishment request, wherein the configuration information is preset and saved in the DU, the configuration information comprises Signaling Radio Bear 1 (SRB1) configuration information, the SRB 1 configuration information comprises an optimal value of a parameter of the SRB1, and the optimal value of the parameter of the SRB1 is determined based on a mapping relationship between historical parameter values of the SRB1 and the number of successful UE configurations;

encapsulating the configuration information in an RRC connection re-establishment message, and sending the RRC connection re-establishment message to the UE;

receiving an RRC connection re-establishment complete message sent by the UE, wherein the RRC connection re-establishment complete message carries a Public Land Mobile Network (PLMN) identity;

and determining a target Central Unit (CU) according to the PLMN identity, and sending an initial uplink (UL) RRC message to the target CU.

6. The method of claim 5, further comprising:

encapsulating the RRC connection re-establishment complete message in the initial UL RRC message.

7. An electronic device, comprising:

a memory, a processor, a Distributed Unit (DU), a Central Unit (CU) and a computer program stored in the memory and executable by the processor which, when executed by the processor, causes the processor to perform the method of claim 5.

8. A non-transitory computer-readable storage medium, storing a computer program which, when executed by a processor, causes the processor to perform the method of claim 5.

9. A network connection method under network sharing, which is performed by a Central Unit (CU), the method comprising:

receiving an initial uplink (UL) Radio Resource Control (RRC) message sent by a Distributed Unit (DU); and establishing or re-establishing a context of a User Equipment (UE) in response to the initial UL RRC message;

wherein the CU is a target CU determined by the DU according to a Public Land Mobile Network (PLMN) identity carried in an RRC connection setup complete message or an RRC connection re-establishment complete message; the RRC connection setup complete message or the RRC connection re-establishment complete message is sent by the UE to the DU according to an RRC connection setup message or an RRC connection re-establishment message sent by the DU, configuration information is encapsulated by the DU in the RRC connection setup message or an RRC connection re-establishment message, and the configuration information is preset and saved in the DU, the configuration information comprises Signaling Radio Bear 1 (SRB1) configuration information, the SRB1 configuration information comprises an optimal value of a parameter of the SRB1, and the optimal value of the parameter of the SRB1 is determined based on a mapping relationship between historical parameter values of the SRB1 and the number of successful UE configurations.

10. The method of claim 9, wherein the initial UL RRC message carries an RRC connection setup complete message or an RRC connection re-establishment complete message; the method further comprises:

parsing the initial UL RRC message;

in response to determining that the initial UL RRC message carries the RRC connection setup complete message, establishing a context of the UE in response to the initial UL RRC message; or in response to determining that the initial UL RRC message carries the RRC connection re-establishment complete message, re-establishing a context of the UE in response to the initial UL RRC message.

11. The method of claim 9, wherein re-establishing a context of the UE comprises:

sending a context acquisition request for context of the UE to a source base station;

receiving a context acquisition response message sent by the source base station according to the context acquisition request, wherein the context acquisition response message carries context information of the UE;

and re-establishing a context of the UE according to the context information of the UE.

12. An electronic device, comprising:

a memory, a processor, a Distributed Unit (DU), a Central Unit (CU) and a computer program stored in the memory and executable by the processor which, when executed by the processor, causes the processor to perform the method of claim 9.

13. A non-transitory computer-readable storage medium, storing a computer program which, when executed by a processor, causes the processor to perform the method of claim 9.

* * * * *